J. R. McWANE.
CORE BAR PULLING AND CORE CUTTING APPARATUS.
APPLICATION FILED NOV. 18, 1909.
967,039.
Patented Aug. 9, 1910.
2 SHEETS—SHEET 1.
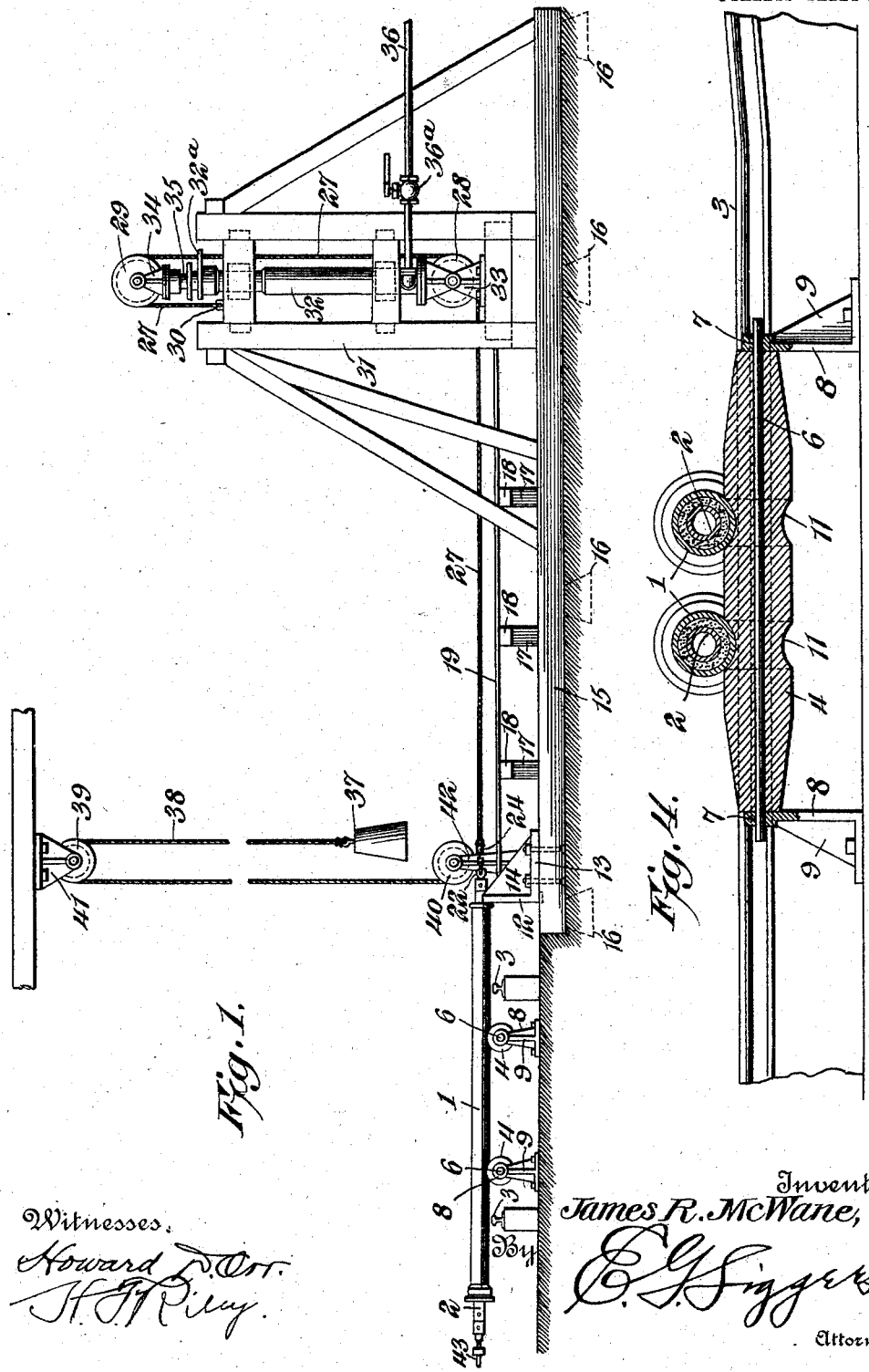

J. R. McWANE.
CORE BAR PULLING AND CORE CUTTING APPARATUS.
APPLICATION FILED NOV. 18, 1909.

967,039.

Patented Aug. 9, 1910.
2 SHEETS—SHEET 2.

UNITED STATES PATENT OFFICE.

JAMES R. McWANE, OF BIRMINGHAM, ALABAMA.

CORE-BAR-PULLING AND CORE-CUTTING APPARATUS.

967,039.   Specification of Letters Patent.   Patented Aug. 9, 1910.

Application filed November 18, 1909. Serial No. 528,750.

*To all whom it may concern:*

Be it known that I, JAMES R. McWANE, a citizen of the United States, residing at Birmingham, in the county of Jefferson and State of Alabama, have invented a new and useful Core-Bar-Pulling and Core-Cutting Apparatus, of which the following is a specification.

The invention relates to a core bar pulling and core cutting apparatus.

In the ordinary practice of manufacturing pipe, the core bars are pulled in the foundry by the cranes before the flasks are shaken out. This is not only hot and disagreeable work in summer time, but increases the operation of the crane and lessens the out-put of the foundry.

The object of the present invention is to lessen the work of the crane and increase the out-put of the plant by enabling the pipes to be pulled from the flasks by the core bars, thereby eliminating the employment of chains in pulling pipes from the flasks. Also it is the object of the invention to enable the core adhering to the interior of the pipes to be cut simultaneously with the pulling of the core bar, thereby greatly lessening the labor and simplifying the operation of cleaning the pipes.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a pipe pulling and core cutting apparatus, constructed in accordance with this invention. Fig. 2 is a plan view of the same. Fig. 3 is an enlarged horizontal sectional view of a portion of the apparatus, illustrating the arrangement of the core cutters and the means for connecting the core bars with the pulling mechanism. Fig. 4 is an enlarged detail sectional view, illustrating the construction of the pipe supporting rolls.

Like numerals of reference designate corresponding parts in all the figures of the drawings.

The pipes 1, after being pulled from the flasks by the core bars 2, roll down a track 3 to a pair of pipe supporting rolls 4. In order to enable the pipes to be pulled by the core bars, the latter are equipped at their lower portions with a flange 5, preferably formed by welding a band on the exterior of the core bar. The band, which is of a size to fit within the lower end of the pipe 1, retains the core bar material therein and prevents the same from mixing with the molding sand when the flasks are shaken out. The pipes are pulled by connecting the crane with the shackles (not shown) with which the core bars are equipped, and which are removed from the core bars prior to the arrival of the pipes at the core pulling apparatus.

The rolls 4, which are located between the rails of the track 3, extend longitudinally of the latter and are provided with terminal journals or gudgeons, preferably formed by a central rod or shaft 6 and arranged in suitable bearing openings 7 of the bearing brackets 8. The bearing brackets 8 are preferably angular being composed of vertical supporting portions and horizontal attaching portions. The vertical supporting portion is braced by an integral web 9, and the horizontal attaching portion is bolted to the adjacent cross ties, or other suitable supports. The pipe supporting rolls have tapered end portions 10 to enable the pipes to be readily rolled on and off them, and the said rolls are provided at opposite sides of the center with annular centering grooves 11, adapted to aline the pipes with the core bar pulling mechanism, which is located at one side of the track. The pipes are rolled onto the longitudinal rolls 4 at one end thereof and are rolled off at the other end of the same after the core bars have been pulled. When the pipes rest in the centering grooves of the rolls 4, they are supported above the rails of the track 3, as clearly illustrated in Fig. 1 of the drawings, so that they may be freely moved in a longitudinal direction to position them properly with relation to the core bar pulling mechanism. The core bar pulling mechanism is equipped with an abutment 12 of angular form, consisting of a vertical pipe engaging portion, a horizontal attaching portion 13 and integral webs 14, located at opposite sides of the abutment, as clearly illustrated in Fig. 3 of the drawings. The horizontal attaching plate or portion 13 is seated upon and bolted to a pair of parallel beams 15, which are laid upon transverse sills or supports 16. The spaced parallel beams 15 form supports for short blocks or posts 17, arranged at intervals and connected by transverse top bars 18 to which a core bar-receiving platform 19 is secured. The core bar receiving platform is preferably constructed of sheet metal, but may be made of any suitable material.

The vertical portion of the abutment is provided with half round recesses or openings 20, which are of sufficient size to permit the core bars and their flanges 5 to pass through them. These recesses or openings 20 are of substantially the diameter of the interior of the pipe, so that the adjacent ends of the same will fit against the vertical portion of the abutment 12 and be held against movement when the core bars are pulled. The core bars project beyond the vertical portions of the abutment 12, and are provided with interiorly arranged transverse pins 21, which are engaged by hooks 22 of short chains 23. The chains 23 are connected with and spaced apart by a cross bar 24, the terminal links 25 of the chains 23 being of sufficient size to receive the ends of the cross bar 24, which is perforated for the reception of keys 26 for retaining the chains on the cross bar. The terminal links are also connected with cables 27, or other suitable flexible connections, and the chains and hooks constitute the attaching means for connecting the cables with the core bars. The cables, which are parallel, extend beneath lower guiding pulleys 28 and upward over upper guiding pulleys 29, and are secured at their inner ends 30 to an upright frame 31, in which a hydraulic cylinder 32 is mounted. The frame, which is supported by inclined braces, as shown, may be of any suitable construction, and the pulleys 28, which constitute the lower guiding means, are grooved and are arranged in a suitable bracket 33, which also supports the lower end of the hydraulic cylinder 32. The pulleys 29, which constitute the upper guiding means for the cables, are grooved and mounted in suitable bearings of a bracket 34, which is carried by the plunger 35 of the hydraulic cylinder. The reeving of the cables around the upper guiding means in the manner shown secures a relatively long pull from a comparatively short stroke. The cylinder 32 is provided at its upper portion with a horizontally projecting flange 32ª, having suitable guide openings for the cables 27. The fluid pressure is admitted to the cylinder 32 through a feed pipe 36, having a controlling valve 36ª. When the plunger moves upward, the outer ends of the cables are drawn inward toward the frame, thereby pulling the core bars from the pipes. When the plunger descends, the cables and the attaching means are automatically returned to their initial position by means of a weight 37 and a short rope or cable 38, or other flexible connection. The weight is attached to one end of the rope or cable, which extends upward around an upper guiding pulley 39 and then downward beneath a lower guiding pulley 40. The guiding pulleys, which are grooved, are mounted in suitable bearing brackets 41 and 42, and when the core bars are pulled from the pipes, the weight 37 is raised so as to return the flexible connections to the abutment. The core bars are deposited upon the platform 19 from which they may be removed by any suitable means.

With the present method of cleaning cast iron pipes, it is necessary to cut with a tool two opposite longitudinal grooves in the core bar material adhering to the interior of the pipes, and then hammer from the pipes the baked clay within the same. In order to enable these grooves to be cut simultaneously with the pulling of the core bars, cutting devices 45 are connected to the shackle ends of the core bars. Each cutting device consists of a solid round attaching portion or plug 44 and oppositely disposed substantially U-shaped cutters 45, which form elongated loops. The outer sides or portions of the cutters are bent at an intermediate point and terminate in cutting points 46, which are arranged at an acute angle to the adjacent portions of the inner sides of the cutters and at an obtuse angle to the adjacent portions of the outer sides. The inner sides of the cutters constitute shanks, which are suitably secured to the attaching portion 44. The round attaching portion 44 fits in the opening of a sleeve 47 with which the shackle end of the core bar is equipped, and it is detachably secured to the sleeve by a removable transverse pin 48, piercing the sleeve and the attaching portion, as clearly illustrated in Fig. 3 of the drawings. The cutting portions of the cutters are resilient and when applied to the core bar, are confined by a ring or band 49 driven on the cutting device and adapted to hold the cutting portions sufficiently close together to enter the adjacent end of the pipe, when the core bar is pulled. As the pipe is drawn inward, the band is carried into contact with the end of the pipe, and is knocked or stripped off the cutters through such contact, thereby releasing the resilient cutters, which spring outward and positively cut opposite grooves in the core bar material adhering to the interior of the pipe. While I have illustrated but one form of cutting device, yet it will be apparent that other cutting devices may be substituted for that shown and described.

Having thus fully described my invention, what I claim as new and desire to secure by Letters Patent, is:—

1. In an apparatus of the class described, the combination with a track adapted to receive the pipes, of pipe-supporting means arranged adjacent to the track in the path of the pipes, and means for pulling the core bars from the pipes.

2. In an apparatus of the class described, the combination with a track adapted to receive the pipes, of a pipe support arranged adjacent to the track in the path of the pipes and including a roll, and means for pulling the core bars from the pipes.

3. In an apparatus of the class described, the combination with a track adapted to receive the pipes, of a pipe support arranged adjacent to the track in the path of the pipes and including a tapered roll adapted to permit the pipes to be run on and off it, and means for pulling the core bars from the pipes.

4. In an apparatus of the class described, the combination with a track adapted to receive the pipes, of a pipe support arranged adjacent to the track in the path of the pipes and including a roll having an annular groove for positioning the pipes, and means for pulling the core bars from the pipes.

5. In an apparatus of the class described, the combination with a track for the pipes, of a roll extending longitudinally of the track and arranged in the path of the pipes and adapted to support the same and capable also of permitting the pipes to be moved transversely of the track, and means for pulling the core bars from the pipes.

6. In an apparatus of the class described, the combination with a pipe track, of spaced pipe-supporting rolls arranged longitudinally of the track and having pipe-receiving grooves arranged to position a plurality of pipes, and means for pulling the core bars from the pipes.

7. In an apparatus of the class described, the combination with pipe tracks having opposite rails, of spaced rolls arranged between the rails of the track and extending longitudinally thereof, said rolls having tapered end portions and provided with centering grooves and adapted to support the pipes clear of the rails, and means for pulling the core bars.

8. In an apparatus of the class described, the combination with a pipe track, of pipe-supporting means arranged in the path of the rolls, and core bar pulling mechanism arranged at one side of the track in line with the said pipe-supporting means.

9. In an apparatus of the class described, the combination with a pipe track, of an abutment located at one side of the track in position to receive the ends of the pipes, and means for pulling the core bar from the pipes while the latter are held by the abutment.

10. In an apparatus of the class described, the combination of a pipe track, of pipe-supporting rolls arranged in the path of the pipes, an abutment located at one side of the track opposite the rolls and in position to receive the ends of the pipes, and means for pulling the core bars from the pipes.

11. In an apparatus of the class described, the combination of pipe-supporting means, an abutment arranged to receive the end of a pipe and having a recess for the passage of the core bar, and means for pulling the core bar.

12. In an apparatus of the class described, the combination of means for supporting the pipes, an abutment having an upright portion to receive the ends of the pipes and provided with segmental recesses to permit the passage of the core bars, and means for pulling the core bars from the pipes.

13. In an apparatus of the class described, the combination of pipe-supporting means, an abutment composed of a bottom attaching portion, an upright portion arranged to receive the ends of the pipes and having recesses for the passage of the core bars, and integral webs bracing the upright portion.

14. In an apparatus of the class described, the combination of means for supporting a pipe in a horizontal position, a flexible connection, means for securing the latter to a core bar, and means for actuating the flexible connection for pulling the core bar.

15. In an apparatus of the class described, the combination of an abutment adapted to receive an end of a pipe, and means for pulling the core bar from the pipe, said means including a flexible connection, and a fluid pressure cylinder having a plunger for actuating the flexible connection.

16. In an apparatus of the class described, the combination of means for supporting a pipe in a horizontal position, a flexible connection having means at one end for connecting it to a core bar and fixed at its other end, and a fluid pressure cylinder having a plunger provided with guiding means receiving an intermediate portion of the flexible connection for actuating the latter.

17. In an apparatus of the class described, the combination of means for supporting a pipe in a horizontal position, an upright fluid pressure cylinder having a plunger, and a flexible connection actuated by the plunger and having means for connecting it with a core bar.

18. In an apparatus of the class described, the combination of means for supporting a pipe in a horizontal position, an upright fluid pressure cylinder having a plunger provided with guiding means, and a flexible connection fixed at one end and provided at its other end with means for connecting it with a core bar and having an intermediate portion arranged in the guiding means.

19. In an apparatus of the class described, the combination of means for supporting a pipe in a horizontal position, an upright fluid pressure cylinder having a plunger, upper and lower guiding means, one of the guiding means being carried by the plunger, and a flexible connection arranged in the guiding means and fixed at one end and provided at its other end with means for connecting it to a core bar.

20. In an apparatus of the class described, the combination of a frame, an upright fluid pressure cylinder having a plunger movable upwardly, upper and lower guide pulleys, the upper guide pulley being carried by the plunger, and a flexible connection fixed at one end and arranged on the guide pulleys and provided at the other end with means for connecting it with a core bar.

21. In an apparatus of the class described, the combination of a frame, an upright fluid pressure cylinder having an upwardly movable plunger, an upper bearing bracket carried by the plunger, a lower bearing bracket supporting the lower end of the cylinder, pulleys mounted in the bearing bracket, a cable fixed at one end and arranged on the guide pulleys, and means located at the other end of the cable for connecting the same with a core bar.

22. In an apparatus of the class described, the combination of means for supporting a plurality of pipes in a horizontal position, an abutment for the said pipes, a plurality of flexible connections, means for actuating the same, and a plurality of spaced chains connected with the said connections and having means for engaging the core bars for pulling the same from the pipes.

23. In an apparatus of the class described, the combination of means for supporting a plurality of pipes in a horizontal position, a plurality of cables, chains carried by the cables and having means for connecting them with the core bars of the pipes, and a transverse bar spacing the chains and the cables.

24. In an apparatus of the class described, the combination of means for supporting a pipe, mechanism for pulling the core bars therefrom, and means for automatically returning the core bar pulling mechanism to its initial position after a core bar has been pulled.

25. In an apparatus of the class described, the combination of means for supporting a pipe, pipe pulling mechanism having means for connecting it to a core bar, and means connected with the flexible connection for returning the same to its initial position after the core bar has been pulled.

26. In an apparatus of the class described, the combination of means for supporting a pipe, pipe pulling mechanism having means for connecting it to a core bar, and a device for returning the flexible connection to its initial position after a core bar has been pulled, said device comprising upper and lower guides, a weight, and a flexible connection carrying the weight and arranged in the upper and lower guides.

27. In an apparatus of the class described, the combination of pipe pulling mechanism comprising spaced cables having means for connecting them with the core bars to be pulled, a cross bar connecting the cables, upper and lower guides, a weight, and a flexible connection attached at one end to the weight and arranged in guides and connected at the other end with the said cross bar.

28. In an apparatus of the class described, the combination of means for supporting a pipe in a horizontal position, an abutment for the pipe, core bar pulling mechanism including a cable having means for connecting it with the core bar to be pulled, and a weight actuated flexible connection connected with the cable for returning the same to its initial position after a core bar has been pulled.

29. In an apparatus of the class described, the combination with core bar pulling mechanism, and a cutting device adapted to be connected with the rear end of a core bar so as to be drawn through the pipe, said cutting device being provided with opposite resilient cutting portions adapted to spring outwardly, and means for compressing the resilient cutting portions to enable the same to enter a pipe.

30. In an apparatus of the class described, the combination with core bar pulling mechanism, and a cutting device adapted to be connected with the rear end of a core bar so as to be drawn through the pipe, said cutting device being provided with opposite resilient cutting portions adapted to spring outwardly, and a detachable confining device engaging the resilient portions of the cutting device and adapted to be stripped off by the pipe when the cutting device enters the same.

31. In an apparatus of the class described, the combination with core bar pulling mechanism, of a cutting device comprising a solid plug adapted to be fitted in one end of a hollow core bar, and approximately U-shaped cutters provided with outer resilient cutting portions and having their inner portions secured to the solid plug, and means for detachably securing the plug within a core bar.

32. In an apparatus of the class described, the combination with core bar pulling mechanism, of a cutting device comprising opposite approximately U-shaped cutters forming elongated loops, the outer sides of the loops being bent at an intermediate point and the terminals thereof being formed into cutting portions, which are arranged at an obtuse angle to the adjacent portions or the outer sides.

33. In an apparatus of the class described, the combination with core bar pulling mechanism, and a cutting device comprising an attaching portion adapted to be secured in the opening of a core bar, and approximately U-shaped cutters having resilient outer cutting portions, and a removable band compressing the outer portions of the cutters and arranged to be stripped off the same by the pipe when the cutter is drawn through the latter.

34. An apparatus of the class described including a core bar provided with means for engaging the lower end of a pipe and for closing the space between the latter and the core bar to confine the core bar material, whereby the core bar may be used for pulling the pipe from a flask.

35. An apparatus of the class described including a core bar provided at the lower portion with an exterior band or flange arranged to confine the core bar material within a pipe, whereby the latter is adapted to be pulled from a flask by the core bar.

36. An apparatus of the class described including a core bar provided at its lower portion with an annular flange arranged to fit within the lower end of a pipe to engage and confine the core bar material, whereby the core bar is adapted to be employed for pulling the pipes from the flasks.

37. In an apparatus of the class described, the combination with a track, of a pipe support arranged to support a pipe transversely of the track in a substantially horizontal position and out of contact with the track, and means for pulling the core bar from the pipe.

38. In an apparatus of the class described, the combination with pipe conveying means, of a pipe support arranged to support a pipe transversely of the said conveying means and above the same, and means for pulling the core bar from the pipe while supported in such position.

39. In an apparatus of the class described, the combination with a track, of means for supporting a pipe above the track and transversely of the same, said pipe extending from both sides of the track, an abutment arranged at one side of the track in position to be engaged by the pipe, and means for pulling the core bar from the pipe.

In testimony, that I claim the foregoing as my own, I have hereto affixed my signature in the presence of two witnesses.

JAMES R. McWANE.

Witnesses.
M. J. BLAIR,
D. W. WALLACE.